(12) United States Patent
Ghose et al.

(10) Patent No.: US 11,210,378 B2
(45) Date of Patent: Dec. 28, 2021

(54) SYSTEM AND METHOD FOR AUTHENTICATING HUMANS BASED ON BEHAVIORAL PATTERN

(71) Applicant: Tata Consultancy Services Limited, Mumbai (IN)

(72) Inventors: Avik Ghose, Kolkata (IN); Sonia Sharma, Guwahati (IN)

(73) Assignee: Tata Consultancy Services Limited, Mumbai (IN)

( * ) Notice: Subject to any disclaimer, the term of this patent is extended or adjusted under 35 U.S.C. 154(b) by 271 days.

(21) Appl. No.: 16/656,188

(22) Filed: Oct. 17, 2019

(65) Prior Publication Data
US 2020/0125711 A1 Apr. 23, 2020

(30) Foreign Application Priority Data
Oct. 17, 2018 (IN) .............................. 201821039448

(51) Int. Cl.
*G06F 21/32* (2013.01)
*G06K 9/00* (2006.01)
(Continued)

(52) U.S. Cl.
CPC ......... *G06F 21/32* (2013.01); *G06K 9/00335* (2013.01); *G06N 3/0445* (2013.01); *G06N 3/0454* (2013.01); *G06N 3/08* (2013.01)

(58) Field of Classification Search
CPC ...................................................... G06F 21/32
See application file for complete search history.

(56) References Cited

U.S. PATENT DOCUMENTS

| 6,351,740 B1* | 2/2002 | Rabinowitz | G06N 3/08 706/22 |
| 2015/0074797 A1* | 3/2015 | Choi | H04W 12/33 726/19 |

(Continued)

OTHER PUBLICATIONS

Van Quan Nguyen • Linh Van Ma • Jin-young Kim • Kwangki Kim • Jinsul Kim; Applications of Anomaly Detection Using Deep Learning on Time Series Data; 2018 IEEE 16th Intl Conf on Dependable, Autonomic and Secure Computing; (Year: 2018).*

(Continued)

*Primary Examiner* — Luu T Pham
*Assistant Examiner* — Chao Wang
(74) *Attorney, Agent, or Firm* — Finnegan, Henderson, Farabow, Garrett & Dunner, LLP (57) ABSTRACT

This disclosure relates generally to authenticating humans based on behavioral pattern. The method and system proposed provides a continuous/seamless monitoring platform for authenticating humans by continuously monitoring routine activities of subjects (Activities of Daily Living (ADL)) in a smart environment using plurality of passive, unobtrusive, binary, unobtrusive non-intrusive sensors embedded in living infrastructure. The proposed method and system for authenticating humans based on behavioral pattern is provided. The daily routine activities of humans/subjects, housed in a smart environment is continuous monitored by plurality of non-intrusive sensors embedded in living infrastructure. Further the collected sensor data is processed in several stages, which includes pre-processing of sensor data, behavioral pattern prediction, error detection based on predicted behavioral pattern and so on for authenticating humans based on behavioral pattern.

6 Claims, 5 Drawing Sheets

(51) Int. Cl.
 *G06N 3/04* (2006.01)
 *G06N 3/08* (2006.01)

(56) References Cited

U.S. PATENT DOCUMENTS

| | | |
|---|---|---|
| 2016/0335865 A1 | 11/2016 | Sayavong et al. |
| 2017/0117841 A1 | 4/2017 | Watanabe et al. |
| 2019/0080072 A1* | 3/2019 | Van Os ............... G06F 3/04883 |
| 2020/0107072 A1* | 4/2020 | Lomada ............. H04N 21/8456 |
| 2021/0174937 A1* | 6/2021 | Swisher ................ G06T 11/003 |

OTHER PUBLICATIONS

Li, Frédéric • Shirahama, Kimiaki • Nisar, Muhammad Adeel • Köping, Lukas • Grzegorzek, Marcin; Comparison of Feature Learning Methods for Human Activity Recognition Using Wearable Sensors; Sensors (Basel, Switzerland), 18(2), 679; (Year: 2018).*

Shilong Yu • Long Qin • Quanjun Yin; A C-LSTM Neural Network for Human Activity Recognition Using Wearables; 2018 International Symposium in Sensing and Instrumentation in IoT Era (ISSI) (pp. 1-6); (Year: 2018).*

Fiorini, L. et al. (Mar. 2017). "Unsupervised Machine Learning for Developing Personalised Behaviour Models Using Activity Data," *Sensors*, vol. 17, issue 1034; pp. 1-17.

* cited by examiner

SYSTEM AND METHOD FOR AUTHENTICATING HUMANS BASED ON BEHAVIORAL PATTERN

CROSS-REFERENCE TO RELATED APPLICATIONS AND PRIORITY

The present application claims priority from Indian patent application no. 201821039448, filed on Oct. 17, 2018.

TECHNICAL FIELD

The disclosure herein generally relates to field of authenticating humans and, more particularly, to a system and a method for authenticating humans based on behavioral pattern.

BACKGROUND

In today's technology enriched society, authentication of humans is an important factor for various applications across different domains, such as visual surveillance, smart environment and driver assistance systems and so on. Considering an example of a smart environment such as a smart home, one of the most important aspect of the smart home includes home security as it has been a major issue due to increasing crime rate. Hence it is very important to take proper measures for robust authentication of humans to ensure home security and prevent intrusion.

For robust and efficient authentication of a human in a smart home, a popular technique used is to monitor daily routine activities of a human. The daily routine activities of a human can be monitored in several ways such as by providing Ambient Assisted Living (AAL) among several other existing techniques. AAL utilizes several sensors to monitor routine Activities of Daily living (ADL) of subjects who use them. During the monitoring process, any detection of deviation in routine activities could mean possible presence of an intruder.

The collection of data for daily routine is ubiquitous and so requires more parameters to be sensed for a longer duration. The existing techniques for monitoring routine activities of subject use cameras or sensors for collecting data, however usage of cameras or sensors invades privacy, while sensors are circuitry devices and may be prone to failure due to technical issues such as power outage or may even sound a false alarm. Further certain existing techniques utilize plurality of advanced non-intrusive sensor technologies such as infrastructure based sensors to monitor ADLs. However the non-intrusive sensor data collected using advanced non-intrusive sensors is high dimensional, that is challenging to store or process for further analysis. Further, the high dimensional data collected by non-intrusive sensors cannot be easily processed using existing machine learning techniques due to its enormous quantity.

SUMMARY

Embodiments of the present disclosure present technological improvements as solutions to one or more of the above-mentioned technical problems recognized by the inventors in conventional systems. For example, in one embodiment, a method for authenticating humans based on behavioral pattern is provided. The daily routine activities of humans/subjects, housed in a smart environment is continuous monitored by plurality of non-intrusive sensors embedded in living infrastructure. Further the collected sensor data is processed in several stages, which includes pre-processing of sensor data, behavioral pattern prediction, error detection based on predicted behavioral pattern and so on for authenticating humans based on behavioral pattern.

In another aspect, a method for authenticating humans based on behavioral pattern is provided. The method includes receiving sensor data using a plurality of sensors from a human, wherein received sensor data indicates activities of daily living (ADL) pertaining to a human for a specific time interval. Further the corrupt sensor data in the received sensor data is substituted with correct sensor data using Long Short-Term Memory (LSTM), wherein to generate corrected sensor data, includes substituting corrupt sensor data with correct sensor data using Long Short-Term Memory (LSTM), wherein the corrupt sensor data is substituted with the correct sensor data based on a learning pattern and historical data stored in a database. Furthermore a semantic vector representation of the corrected sensor data (long vector) is generated wherein the semantic vector representation comprises a plurality of sub-vectors, wherein each of the plurality of sub-vectors comprise of a subset of the corrected sensor data of a pre-determined time interval. Further size of the semantic vector representation of the corrected sensor data is optimized to generate an optimized vector data using an auto encoder includes applying a dimension reduction based window sizing technique on the semantic vector representation of the corrected sensor data. Furthermore a behavior time series is predicted from the optimized vector data using a Long Short-Term Memory techniques. Further an error signal based on the behavior time series is generated based on comparison of predicted behavior time series with current optimized vector data. Finally a classifier is provided for classification wherein humans are authenticated and identified based on the error signal.

In another aspect, a system for authenticating humans based on behavioral pattern is provided. The system comprises a memory storing instructions and a centralized database, one or more communication interfaces; and one or more hardware processors coupled to the memory via the one or more communication interfaces, wherein the one or more hardware processors are configured by instructions to: includes a pre-processing module for receiving sensor data using a plurality of sensors from a human, wherein received sensor data indicates activities of daily living (ADL) pertaining to a human for a specific time interval. Further the corrupt sensor data in the received sensor data is substituted with correct sensor data in data correction module using Long Short-Term Memory (LSTM), wherein to generate corrected sensor data, includes substituting corrupt sensor data with correct sensor data using Long Short-Term Memory (LSTM), wherein the corrupt sensor data is substituted with the correct sensor data based on a learning pattern and historical data stored in a database. Furthermore in a semantic vector generation module, a semantic vector representation of the corrected sensor data (long vector) is generated wherein the semantic vector representation comprises a plurality of sub-vectors, wherein each of the plurality of sub-vectors comprise of a subset of the corrected sensor data of a pre-determined time interval. Further in a optimizing module, size of the semantic vector representation of the corrected sensor data is optimized to generate an optimized vector data using an auto encoder includes applying a dimension reduction based window sizing technique on the semantic vector representation of the corrected sensor data. Furthermore a behavior time series is predicted from the optimized vector data using a Long Short-Term Memory techniques in a prediction module. Further in an error generation module, an error signal based on the behavior time series is generated based on comparison of predicted behavior time series with current optimized vector data. Finally a classifier is provided in a classifier module for classification wherein humans are authenticated and identified based on the error signal.

In yet another aspect, a non-transitory computer readable medium for authenticating humans based on behavioral pattern is provided. The program includes receiving sensor data using a plurality of sensors from a human, wherein received sensor data indicates activities of daily living (ADL) pertaining to a human for a specific time interval. Further the corrupt sensor data in the received sensor data is substituted with correct sensor data using Long Short-Term Memory (LSTM), wherein to generate corrected sensor data, includes substituting corrupt sensor data with correct sensor data using Long Short-Term Memory (LSTM), wherein the corrupt sensor data is substituted with the correct sensor data based on a learning pattern and historical data stored in a database. Furthermore a semantic vector representation of the corrected sensor data (long vector) is generated wherein the semantic vector representation comprises a plurality of sub-vectors, wherein each of the plurality of sub-vectors comprise of a subset of the corrected sensor data of a pre-determined time interval. Further size of the semantic vector representation of the corrected sensor data is optimized to generate an optimized vector data using an auto encoder includes applying a dimension reduction based window sizing technique on the semantic vector representation of the corrected sensor data. Furthermore a behavior time series is predicted from the optimized vector data using a Long Short-Term Memory techniques. Further an error signal based on the behavior time series is generated based on comparison of predicted behavior time series with current optimized vector data. Finally a classifier is provided for classification wherein humans are authenticated and identified based on the error signal.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

Figure 1:
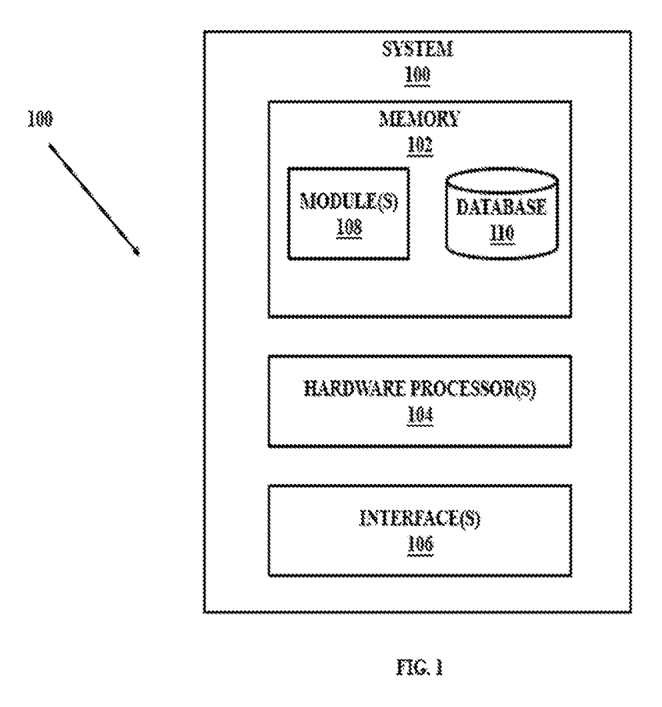
FIG. 1 illustrates an exemplary block diagram of a system for authenticating humans based on behavioral pattern in accordance with some embodiments of the present disclosure.

FIG. 1 illustrates an exemplary block diagram of a system 100 for authenticating humans based on behavioral pattern according to an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The memory 102 comprises one or more modules 108 and the database 110. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical subject interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 2:
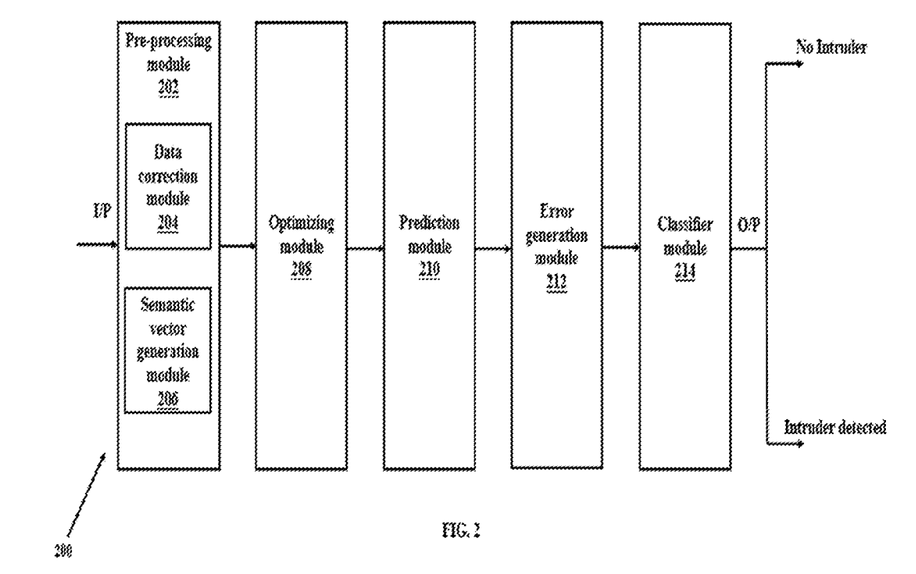
FIG. 2 is a functional block diagram of various modules stored in module(s) of a memory of the system of FIG. 1 in accordance with some embodiments of the present disclosure.

FIG. 2, with reference to FIG. 1, is a block diagram of various modules 108 stored in the memory 102 of the system 100 of FIG. 1 in accordance with an embodiment of the present disclosure. In an embodiment of the present disclosure, the module 108 comprises a pre-processing module 202 that further comprises of a data correction module 204 and a semantic vector generation module 204. Further the system comprises an optimizing module 206, a prediction, module 210, an error generation module 212 and a classifier module 214 that are implemented as at least one of a logically self-contained part of a software program, a self-contained hardware component, and/or, a self-contained hardware component with a logically self-contained part of a software program embedded into each of the hardware component that when executed perform the above method described herein.

According to an embodiment of the disclosure, the system 200 comprises a pre-processing module 202 that is configured for receiving sensor data using a plurality of sensors from a human. The received sensor data indicates Activities of Daily Living (ADL) pertaining to a subject for a specific time interval from a smart environment.

In an embodiment, a plurality of non-intrusive sensors are embedded in a smart environment such as an old age home, orphanage or home and so on. The plurality of sensors used are passive (such as photographic, thermal, electric field sensing, chemical, infrared and so on) and binary (such as pressure switches, temperature switches, thru-beam photoelectric sensors, proximity sensors, push buttons and so on) sensors which are unobtrusive and non-intrusive and which would hereafter be referred to as non-intrusive sensors. The plurality of non-intrusive sensors continuously monitor routine activities of subjects housed in the smart environment. The plurality of non-intrusive sensors are connected to a variety of network devices, including routers, bridges, servers, computing devices, storage devices. In an embodiment, sensor data comprises data such as sensor replication, sensor status, sensor position, remaining battery life (used to power up the sensor), current date and time. Further, the collected sensor data needs to be further analyzed in cumulating with other attributes stored to label ADL or routine activities. For example, sensor data collected is illustrated below in table 1:

TABLE 1

| Date | Time | Sensor status | Sensor replication | Location of sensor | Sensor type |
|---|---|---|---|---|---|
| 2017:12:01 | 00:00:37 | OK | 1 | door | PIR |
| 2017:12:01 | 00:00:37 | NOK | 0 | bed | Vibration |
| 2017:12:01 | 00:00:37 | OK | 23 | Bed room | temperature |
| 2017:12:01 | 00:00:37 | OK | 0 | kitchen | PIR |

As can be depicted from the above Table 1, sensor data indicates ADL pertaining to a human for a specific time interval from a smart environment. However, the ADL activities may not be received at all times due to failure or faulty sensors that may be caused due to various reasons that include battery drain, communication outage, malfunctioning. Hence the received sensor data comprises of correct sensor data and corrupt sensor data, wherein the corrupt sensor data refers to gaps in the received sensor data that caused due to sensor failure. In an embodiment, a 'sensor status' parameter reflects NOK' during a sensor failure and the sensor status is set to "OK", when the sensor is receiving sensor data. Further, the 'Sensor Replication' parameter indicates number of instances of the sensor such as temperature or pressure sensors which are usually replicated. Further, the parameter 'Location of sensor' could give information about physical location of the sensor. The collected sensor data is labeled on basis of sensor replication, sensor status and sensor position" if on 1-1-2017 at 1:00:07 sensor position is bed, sensor replication is 1 and sensor status is OK, then sensor labelling would be 1-1-2017 at 1:00:07 subject is on the bed and activity is labeled as resting/sleeping.

According to an embodiment of the disclosure, the system 200 further comprises a data correction module 204 within the pre-processing module 202. The data correction module 204 is configured to process the received sensor data to substitute corrupt sensor data with correct sensor data. The received sensor data comprises of correct sensor data and corrupt sensor data, wherein the corrupt sensor data refers to gaps in the received sensor data that are caused due to sensor failure. In an embodiment, a 'sensor status' parameter is used to identify the correct sensor data and the corrupt sensor data wherein the correct sensor data is identified as the sensor data that is received when if value of 'sensor status' parameter is 'OK' while the corrupt sensor data is identified as the sensor data that is received when the sensor status is set to "NOK". Hence the corrupt sensor data is identified based on 'sensor status' parameter. Further the identified corrupt sensor data is substituted with correct sensor data to generate corrected sensor data (long vector) using Long Short-Term Memory (LSTM) techniques, based on a learning pattern and historical data stored in a database. The corrupt sensor data is substituted with correct sensor data using LSTM models techniques known in art such as stateful LSTM. In an embodiment, a stateful model may comprise several layers which are connected in numerous ways such as one fully connected input layer of dimension one, two hidden layers of dimension fifty, one fully connected output layer of dimension one and so on. Further the stateful LSTM may also include Activation function such as Rectified Linear Unit (ReLU) and Minimization Parameter such as Root Mean Square Deviation (RMSE). Furthermore, the corrected sensor data is further processed to fill any gaps in sensor data.

According to an embodiment of the disclosure, the system 200 further comprises a semantic vector generation module 206 within the pre-processing module 202. The semantic vector generation module 206 is configured for generating a semantic vector representation of the corrected sensor data (long vector). Further in the semantic vector generation module 206, a semantic vector representation of the corrected sensor data (long vector) is generated, wherein the semantic vector representation comprises a plurality of sub-vectors, wherein each of the plurality of sub-vectors comprise of a subset of the corrected sensor data of a pre-determined time interval. In an embodiment, vector and sub-vectors could be represented as long vector and short vector, wherein long vector comprises of multiple short vector. Further, in an example embodiment, long vector represents 24 hours data of a subject, while short vectors represent activity of a subject for a pre-defined time interval (e.g., say each short vector may represent data of 1 second). The long and short vectors may be expressed using parameters sensor replication (s), number of sensors (n) & time stamp (t) as shown below;

$$(V_n^i) = (t_1; s_1; s_2; \ldots ; s_n); (t_2; s_1; s_2; \ldots ; s_n); \ldots ; (t_{86400}; s_1; s_2; s_n);$$

Where,
$(V_x^i)$ is $x^{th}$ long vector for $i^{th}$ subject
$(t_j; S_1; S_2; \ldots ; S_N)$ is a single short vector at the $j^{th}$ second of a day.

Figure 5:
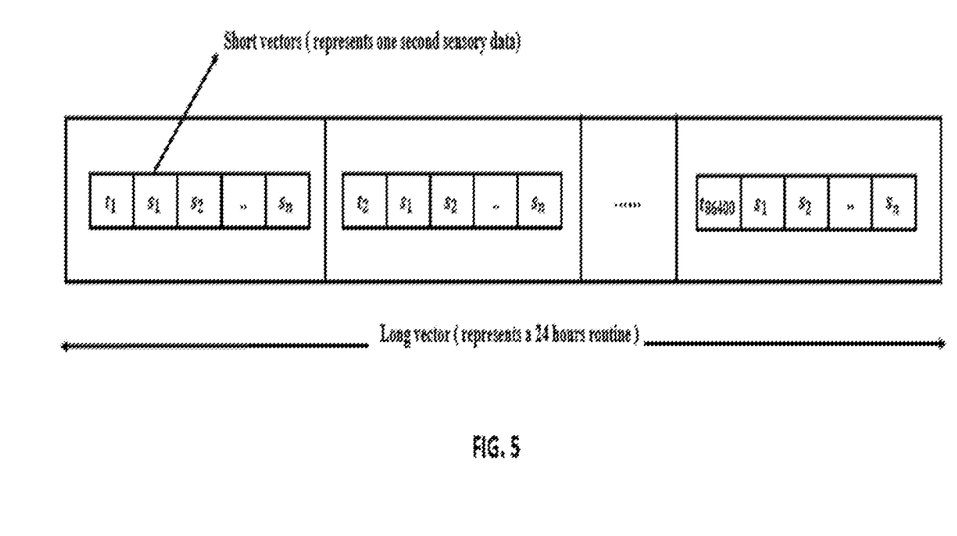
FIG. 5 illustrates vector and sub-vectors represented as a long vector and short vector(s) for a day respectively, in accordance with some embodiments of the present disclosure.

In an embodiment, representation of long and short vectors for a day (24 hours) using parameters s, n, t shown in FIG. 5.

According to an embodiment of the disclosure, the system 200 further comprises an optimizing module 208. The optimizing module 208 is configured for optimizing size of the semantic vector representation of the corrected sensor data to generate an optimized vector data using an auto encoder. The dimensions of corrected sensor data (long vectors) is (very) high for manual interpretation as it comprises of Activities of Daily Living (ADL) of a human being, wherein, in an embodiment, a long vector represents a daily routine (24 hours) of a person which further comprises of 86400 short vectors. Further, since sensor data is received from a plurality of sensors (N), the received sensor data comprises 84600 short vectors which could be represented as 84600*(N+1). Hence the high dimensional corrected sensor data is optimized in the optimizing module 208. In an embodiment, the optimizing module 208 comprises an auto-encoder, which is a neural network based model to reduce dimensions of the high dimensional corrected sensor data. The autoencoder reduces size of semantic vector representation of the corrected sensor data by applying dimension reduction based window sizing technique (e.g., known in the art technique), on the semantic vector representation of the corrected sensor data to generate the optimized vector data.

According to an embodiment of the disclosure, the system 200 further comprises a prediction module 210. The prediction module 208 is configured for predicting a behavior time series from the optimized vector data using a Long Short-Term Memory (LSTM) techniques. In an embodiment, considering an example of a smart environment where 50 humans are monitored for 7 months using non-intrusive sensors, then 50*183 semantic vectors are defined and processed using a two-layer LSTM to predict a behavior time series. Further as, data accumulated for 7 months, considering the fact of different sunrise and sunset timings over the year, age of the targets and ecumenical warming incipient data set is engendered with a perpetual shift of 30 seconds in the quotidian activity routine or 0.005-degree change of temperature. Hence incipient data set is of 150 months ascertaining the distributed arbitrariness in the data to eschew the biasing. Further training of 2-layer LSTM is performed in a batch-sagacious manner and cross-validation to evade over-fitting of the data. Finally the output layer of the LSTM presages the class of the given optimized vector data. Further considering that the example uses 50 targets human, 50 classes are defined and LSTM is trained to predict behavior time series as shown below;

$$LSTM(S(T))=B(T)$$

where,

LSTM(S(T)) is time series of optimized vector data and B(T) is the corresponding behavior time series.

According to an embodiment of the disclosure, the system 200 further comprises an error generation module 212. The error generation module 212 is configured for generating an error signal by comparison of predicted behavior time series with current optimized vector data. In an embodiment, if B(T) represents the behavior time series predicted by LSTM in the prediction module 210 and B'(T) represents the current optimized vector data, then an error is estimated/represented as follows;

$$E(T)=(B(T)-B'(T))^2$$

According to an embodiment of the disclosure, the system 200 further comprises a classifier module 214. The classifier module is configured for authenticating and identifying humans based on the error signal (E(T)) generated by error generation module 212. The classifier is trained to authenticate and identify humans utilizing mean and standard deviation of E(T) based on known classification techniques that include one-vs-all classification technique. Further, the classifier provided for classification are classifiers known in art such as One-class Support Vector Machine (SVM), Multi-class Support Vector Machine (SVM), Random Forest, Hidden Markov Model (HMM) and Long Short-Term Memory (LSTM). Below in table 3, a comparison of accuracy of estimation of a few known classifying techniques in accordance with some embodiments of the present disclosure:

TABLE 4

| Classifier | Accuracy |
| --- | --- |
| One-class SVM | 72.52 |
| Multi-class SVM | 76.77 |
| Random Forest | 64.01 |
| HMM | 80.52 |
| LSTM | 93.47 |

As can be depicted from the above Table 4, LSTM classification techniques give the best accuracy. Further in case of a false authentication and identification an alert signal is sent to be displayed on a communication interface device(s) or input/output (I/O) interface(s) 106.

Figure 3:
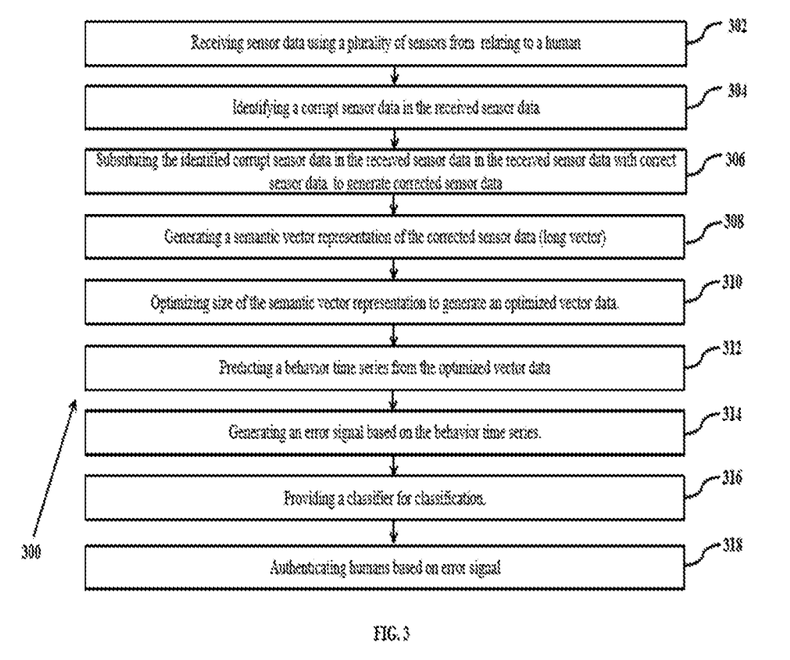
FIG. 3 is an exemplary flow diagram illustrating a method for authenticating humans based on behavioral pattern using the system of FIG. 1 in accordance with some embodiments of the present disclosure.
Figure 4:
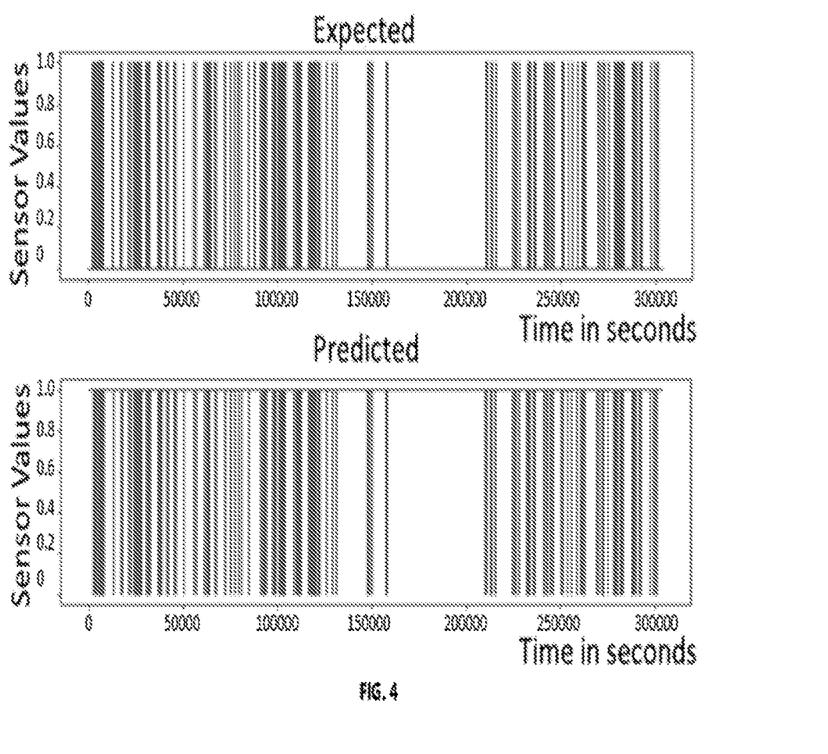
FIG. 4 illustrates predicted and expected graphs of sensor value using Long Short-Term Memory (LSTM) techniques, according to some embodiments of the present disclosure.

FIG. 3, with reference to FIGS. 1-2, is an exemplary flow diagram illustrating a method for authenticating humans based on behavioral pattern using the system 100 of FIG. 1 according to an embodiment of the present disclosure. In an embodiment, the system 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to the components of the system 100 and the modules 202-214 as depicted in FIGS. 1-2, and the flow diagram as depicted in FIG. 3.

At step 302, sensor data collected using a plurality of sensors from a human is received by a pre-processing module 202. The received sensor data indicates activities of daily living (ADL) pertaining to a human for a specific time interval.

In the next step at step 304, a corrupt sensor data is identified in the received sensor data, wherein the corrupt sensor data refers to gaps in the received sensor data that are caused due to sensor failure The corrupt sensor data is identified based on a 'sensor status' parameter obtained from the received sensor data.

In the next step at 306, corrupt sensor data is identified in the received sensor data and is substituted with a correct sensor data using Long Short-Term Memory (LSTM), to generate corrected sensor data in a data correction module 204, which is present within the pre-processing module 202. Further the corrupt sensor data is substituted with the correct sensor data using LSTM based on a learning pattern and historical data stored in a database.

In the next step at 308, a semantic vector representation of the corrected sensor data (long vector) is generated in a semantic vector generation module 206, which is present within the pre-processing module 202. Further the semantic vector representation comprises a plurality of sub-vectors, wherein each of the plurality of sub-vectors comprise of a subset of the corrected sensor data of a pre-determined time interval.

In the next step at 310, the size of a semantic vector representation of the corrected sensor data is optimized to generate an optimized vector data using an auto encoder in an optimizing module 208. Further during optimizing using an auto encoder, size of the semantic vector representation of the corrected sensor data to generate an optimized vector data comprises: applying a dimension reduction based window sizing technique on the semantic vector representation of the corrected sensor data.

In the next step at 312, a behavior time series is predicted from an optimized vector data using a Long Short-Term Memory techniques in a prediction module 210.

In the next step at 314, an error signal is generated based on the behavior time series in an error generation module 212. The error signal is generated by comparison of predicted behavior time series with current optimized vector data.

In the next step at 316, a classifier is provided for classification. The classifier provided for classification are classifiers known in art such as One-class Support Vector Machine (SVM), Multi-class Support Vector Machine (SVM), Random Forest, Hidden Markov Model (HMM) and Long Short-Term Memory (LSTM).

In the next step at 318, humans are authenticated using the classifier based on the generated error signal as described above. The classifier authenticates humans based on mean and standard deviations of generated error signals and sends out an alert signal to be displayed on a communication interface device(s) or input/output (I/O) interface(s) 106 in case the authentication and identification is false.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Hence the proposed method and system for authenticating humans based on behavioral pattern is provided. The daily routine activities of humans/subjects, housed in a smart environment is continuous monitored by plurality of non-intrusive sensors embedded in living infrastructure. Further the collected sensor data is processed in several stages, which includes pre-processing of sensor data, behavioral pattern prediction, error detection based on predicted behavioral pattern and so on for authenticating humans based on behavioral pattern.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for authenticating humans based on their behavioral pattern, the method comprising:

receiving sensor data using a plurality of sensors relating to a human, wherein the received sensor data indicates activities of daily living (ADL) pertaining to a human for a specific time interval;

identifying a corrupt sensor data in the received sensor data;

substituting the identified corrupt sensor data in the received sensor data with a correct sensor data using Long Short-Term Memory (LSTM), to generate corrected sensor data;

generating a semantic vector representation of the corrected sensor data;

optimizing size of the semantic vector representation of the corrected sensor data to generate an optimized vector data and applying a dimension reduction based window sizing technique on the semantic vector representation of the corrected sensor data using an auto encoder;

predicting a behavior time series from the optimized vector data using a Long Short-Term Memory techniques;

generating an error signal based on the behavior time series by comparing the predicted behavior time series with the optimized vector data;

providing a classifier for classification; and authenticating and identifying humans using the classifier based on the error signal, wherein the humans are authenticated and identified based on mean and standard deviations of the generated error signal.

2. The method of claim 1, wherein the corrupt sensor data refers to gaps in the received sensor data that caused due to sensor failure.

3. The method of claim 1 includes substituting the corrupt sensor data with a correct sensor data using Long Short-Term Memory (LSTM), wherein the corrupt sensor data is substituted with the correct sensor data based on a learning pattern and historical data stored in a database.

4. The method of claim 1, wherein the semantic vector representation comprises a plurality of sub-vectors, wherein each of the plurality of sub-vectors comprise of a subset of the corrected sensor data of a pre-determined time interval.

5. A system for authenticating humans based on behavioral pattern, comprising:
 a memory storing instructions and one or more modules;
 a centralized database;
 one or more communication or input/output interfaces; and
 one or more hardware processors coupled to the memory via the one or more communication interfaces, wherein the one or more hardware processors are configured by the instructions to execute the one or more modules comprising:
 a pre-processing module for receiving human related sensor data using a plurality of sensors from a human, wherein the received human related sensor data indicates activities of daily living (ADL) pertaining to a human for a specific time interval;
 a data correction module for identifying a corrupt sensor data and substituting the identified corrupt sensor data with correct sensor data using Long Short-Term Memory (LSTM), to generate corrected sensor data;
 a semantic vector generation module for generating a semantic vector representation of the corrected sensor data;
 an optimizing module for optimizing size of the semantic vector representation of the corrected sensor data to generate an optimized vector data using a an auto encoder, wherein the optimizing module is configured for optimizing size of the semantic vector representation of the corrected sensor data to generate an optimized vector data by an auto encoder, and wherein the auto encoder applies a dimension reduction based window sizing technique on the semantic vector representation of the corrected sensor data;
 a prediction module for predicting a behavior time series from the optimized vector data using Long Short-Term Memory techniques;
 an error generation module for generating error signal by comparing the predicted behavior time series with the optimized vector data; and
 a classifier module for authenticating and identifying humans based on error signal, wherein the humans are authenticated and identified based on mean and standard deviations of the generated error signal.

6. A computer program product comprising a non-transitory computer readable medium having a computer readable program embodied therein, wherein the computer readable program, when executed on a computing device, causes the computing device to:
 receive sensor data using a plurality of sensors relating to a human, wherein the received sensor data indicates activities of daily living (ADL) pertaining to a human for a specific time interval;
 identify a corrupt sensor data in the received sensor data;
 substitute the identified corrupt sensor data in the received sensor data with a correct sensor data using Long Short-Term Memory (LSTM), to generate corrected sensor data;
 generate a semantic vector representation of the corrected sensor data;
 optimize size of the semantic vector representation of the corrected sensor data to generate an optimized vector data and applying a dimension reduction based window sizing technique on the semantic vector representation of the corrected sensor data using an auto encoder using an auto encoder;
 predict a behavior time series from the optimized vector data using a Long Short-Term Memory techniques;
 generate an error signal based on the behavior time series by comparing the predicted behavior time series with the optimized vector;
 provide a classifier for classification; and
 authenticate and identify humans using the classifier based on the error signal, wherein the humans are authenticated and identified based on mean and standard deviations of the generated error signal.

\* \* \* \* \*